United States Patent Office 3,071,610
Patented Jan. 1, 1963

3,071,610
O-[1-(CHLOROMETHYL)2-PROPYNYL] O,O-DI-ALKYL PHOSPHATES AND PHOSPHOROTHIOATES
Herman O. Senkbeil, Midland, Mich., assignor to The Dow Chemical Company, Midland, Mich., a corporation of Delaware
No Drawing. Filed July 6, 1961, Ser. No. 122,074
4 Claims. (Cl. 260—461)

The present invention is directed to phosphates and phosphorothioates corresponding to the formula

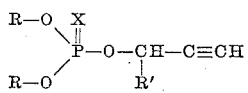

In this and succeeding formulae, each R represents lower alkyl, X represents oxygen or sulfur and R' represents the chloromethyl radicals such as monochloromethyl, dichloromethyl and trichloromethyl. In the present specification and claims, the expression "lower alkyl" is employed to refer to the alkyl radicals containing from 1 to 5 carbon atoms, inclusive. These novel compounds are liquid materials which are somewhat soluble in many common organic solvents and have low solubility in water. The compounds are useful as herbicides and parasiticides and are adapted to be employed as active toxicants for the control of many plants, mites, insects and bacterial and fungal organisms such as aphids, ascarids, worms, flies, nematodes and *Setarica italica*.

The compounds of the present invention are prepared by reacting an O-[1-(chloromethyl)-2-propynyl] phosphorodichloridate or phosphorodichloridothioate corresponding to the formula

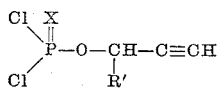

with an alkali metal salt of a lower alkanol, with a mixture of two or more of such salt compounds or successively with two or more of said salt compounds. The reaction conveniently is carried out in an inert organic liquid such as benzene, carbon tetrachloride, diethyl ether and methylene chloride as reaction medium, and preferably in the alkanol from which the alkali metal salt is prepared. Good results are obtained when employing one molecular proportion of the phosphorodichloridate or phosphorodichloridothioate reagent with at least two molecular proportions of one of the alkali metal salt compounds, or a total of at least two molecular proportions of two or more of the salt compounds. Thus, for example, one molecular proportion of the phosphorodichloridate or phosphorodichloridothioate is employed with about two molecular proportions of the alkali metal salt of one of the lower alkanols, or successively with one molecular proportion of an alkali metal salt of one lower alkanol and one molecular proportion of an alkali metal salt of another lower alkanol. The reaction takes place smoothly at the temperature range of from 0° to 75° C. with the production of the desired triester compound and chloride of reaction. This chloride appears in the reaction mixture as alkali metal chloride.

In carrying out the reaction, the reactants are contacted and mixed together in any convenient fashion and maintained for a period of time in the reaction temperature range to insure completion of the reaction. Thus, for example, the phosphorodichloridate or phosphorodichloridothioate is contacted with one of the salt compounds or successively with two or more of the salt compounds. In an alternative procedure, one molecular proportion of the phosphorodichloridate or phosphorodichloridothioate is contacted with a mixture containing a total of about two molecular proportions of 2, 3 or more salt compounds. Following completion of the reaction, the reaction mixture is filtered and any low boiling constituents removed by evaporation or distillation under reduced pressure to obtain the desired product as a residue. This product can be purified by conventional procedures such as washing with water and extraction with suitable organic solvents.

The following examples merely illustrate the invention and are not to be construed as limiting.

*Example 1.—O-[1-(Trichloromethyl)-2-Propynyl] O,O-Dimethyl Phosphorothioate*

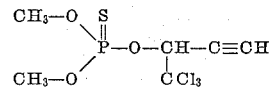

Sodium (6.7 grams; 0.29 mole) is dispersed in 250 milliliters of methanol to prepare a solution containing sodium methylate. O[1-(trichloromethyl)-2-propynyl] phosphorodichloridothioate (44.5 grams; 0.145 mole) is dispersed in 50 milliliters of methanol and the resulting mixture added portionwise with stirring to the above prepared solution of sodium methylate. The addition is carried out over a period of 0.75 hour and at a temperature of from 5° to 10° C. Stirring is thereafter continued for 0.5 hour at a temperature of about 10° C. and an additional half hour at room temperature to insure completion of the reaction. The reaction mixture is then filtered and the filtrate extracted with carbon bisulfide and the carbon bisulfide extract dried over calcium chloride. The dried extract is then concentrated by distillation under reduced pressure at gradually increasing temperatures up to a temperature of 130° C. at 75 millimeters pressure to obtain an O-[1-(trichloromethyl)-2-propynyl] O,O-dimethyl phosphorothioate product as a liquid residue having a molecular weight of 297 and sulfur and phosphorus contents of 11.3 percent and 10.2 percent, respectively, as compared to theoretical contents of 10.75 percent and 10.42 percent.

*Example 2.—O-[1-(Trichloromethyl)-2-Propynyl] O,O-Diethyl Phosphorothioate*

Sodium (4.6 grams; 0.2 mole) is dissolved in 200 milliliters of ethanol to produce a solution of sodium ethylate and 30.7 grams (0.1 mole) of O-[1-(trichloromethyl)-2-propynyl] phosphorodichloridothioate dispersed in 50 milliliters of ethanol added portionwise thereto with stirring. The addition is carried out over 1 hour and at a temperature of 5° C. Stirring is thereafter continued for 1 hour and the temperature of the reaction mixture allowed to raise to room temperature. The reaction mixture is then filtered and the reaction medium removed from the filtrate by distillation under reduced pressure to obtain an O-[1-(trichloromethyl)-2-propynyl] O,O-diethyl phosphorothioate product as a liquid residue having a molecular weight of 325.6 and a chlorine content of 33.1, as compared to a theoretical content of 32.7.

*Example 3.—O-[1-(Chloromethyl)-2-Propynyl] O,O-Dimethyl Phosphate*

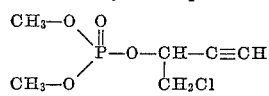

Sodium (4.6 grams; 0.2 mole) is dissolved in 200 milliliters of methanol to prepare a solution of sodium methylate. O-[1-(chloromethyl)-2-propyl] phosphorodichloridate (22.1 grams; 0.1 mole) is added portionwise with stirring to the above solution of the sodium methylate. The addition is carried out at a temperature of from 0° to 10° C. and over a period of about 1 hour. Stirring is thereafter continued as the temperature of the reaction mixture is brought to room temperature and maintained there for an additional hour. The reaction mixture is then filtered and the filtrate concentrated by distillation under reduced pressure to remove low boiling constituents and obtain an O-(1-chloromethyl-2-propynyl) O,O-dimethyl phosphate product as a liquid residue having a molecular weight of 210 and a phosphorus content of 14.8.

In a similar manner, other products of the present invention are prepared as follows:

O-[1-(dichloromethyl)-2-propynyl] O-methyl O-ethyl phosphate (molecular weight of 259; chlorine content of 27 percent) by reacting O-[1-(dichloromethyl)-2-propynyl] phosphorodichloridate successively with sodium methylate and sodium ethylate.

O-[1-(trichloromethyl)-2-propynyl] O,O-dimethyl phosphate (molecular weight of 280; phosphorus content of 11 percent) by reacting together O-[1-(trichloromethyl)-2-propynyl] phosphorodichloridate and potassium methylate.

O-[1-(dichloromethyl)-2-propynyl] O-methyl O-butyl phosphorothioate (molecular weight of 303; sulfur content of 10.6 percent) by reacting O-[1-(dichloromethyl)-2-propynyl] phosphorodichloridothioate successively with sodium methylate and sodium butylate.

O-[1-(chloromethyl)-2-propynyl] O,O-dibutyl phosphorothioate (molecular weight of 310; chlorine content of 11.2 percent) by reacting together O-[1-(chloromethyl)-2-propynyl] phosphorodichloridothioate and potassium butylate.

The compounds of the present invention are useful as parasiticides and herbicides for the control of a number of pests. For such uses, the products are dispersed on a finely divided solid such as chalk or talc or a finely divided solid surface active dispersing agent and the resulting products employed as dusts. Such mixtures may be dispersed in water with or without the addition of surface active dispersing agents and the resulting aqueous suspensions employed as sprays. In other procedures, the products are employed as active constituents in solvent solutions, oil-in-water or water-in-oil emulsions or aqueous dispersions. In representative operations, aqueous compositions containing 1000 parts per million by weight of O-[1-(trichloromethyl)-2-propynyl] O,O-diethyl phosphorothioate or O-[1-(trichloromethyl)-2-propynyl] O,O-dimethyl phosphate gives complete kills of bean aphids and mites. In additional operations, finely divided solid compositions containing 3000 parts per million by weight of O-[1-(trichloromethyl)-2-propynyl] O,O-dimethyl phosphorothioate give substantially complete controls of *Ascaris lumbricoides suum*.

The phosphorodichloridates and phosphorodichloridothioates employed as starting materials in accordance with the teachings of the present invention are prepared by reacting phosphorus oxychloride or phosphorus thiochloride with an alcohol corresponding to the formula

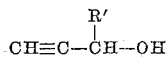

wherein R' is as previously defined and represents ClCH₂—, Cl₂CH— and Cl₃C—. The reaction takes place at temperatures of from 0° to 75° C. with the production of the desired product which is separated by conventional procedures. The 1-(trichloromethyl)-2-propynol as employed above is prepared by known procedures wherein chloral is reacted with acetylene. The 1-(dichloromethyl)-2-propynol and 1-(monochloromethyl)-2-propynol are prepared in known procedures wherein dichloroacetaldehyde or monochloroacetaldehyde is mixed and contacted with a solution of acetylene and ethyl magnesium bromide in diethyl ether.

I claim:

1. A compound corresponding to the formula

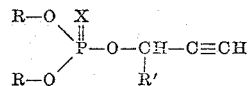

wherein each R represents lower alkyl, R' represents the chloromethyl radicals and X represents a member of the group consisting of oxygen and sulfur.

2. O-[1-trichloromethyl)-2-propynyl] O,O-dimethyl phosphorothioate.

3. O-[1-trichloromethyl)-2-propynyl] O,O-diethyl phosphorothioate.

4. O-[1-(chloromethyl)-2-propynyl] O,O-dimethyl phosphate.

References Cited in the file of this patent
FOREIGN PATENTS
1,058,045   Germany _____ May 27, 1959